Nov. 8, 1938.  W. S. PATTISON  2,135,837
STAIR TREAD
Filed Jan. 15, 1938
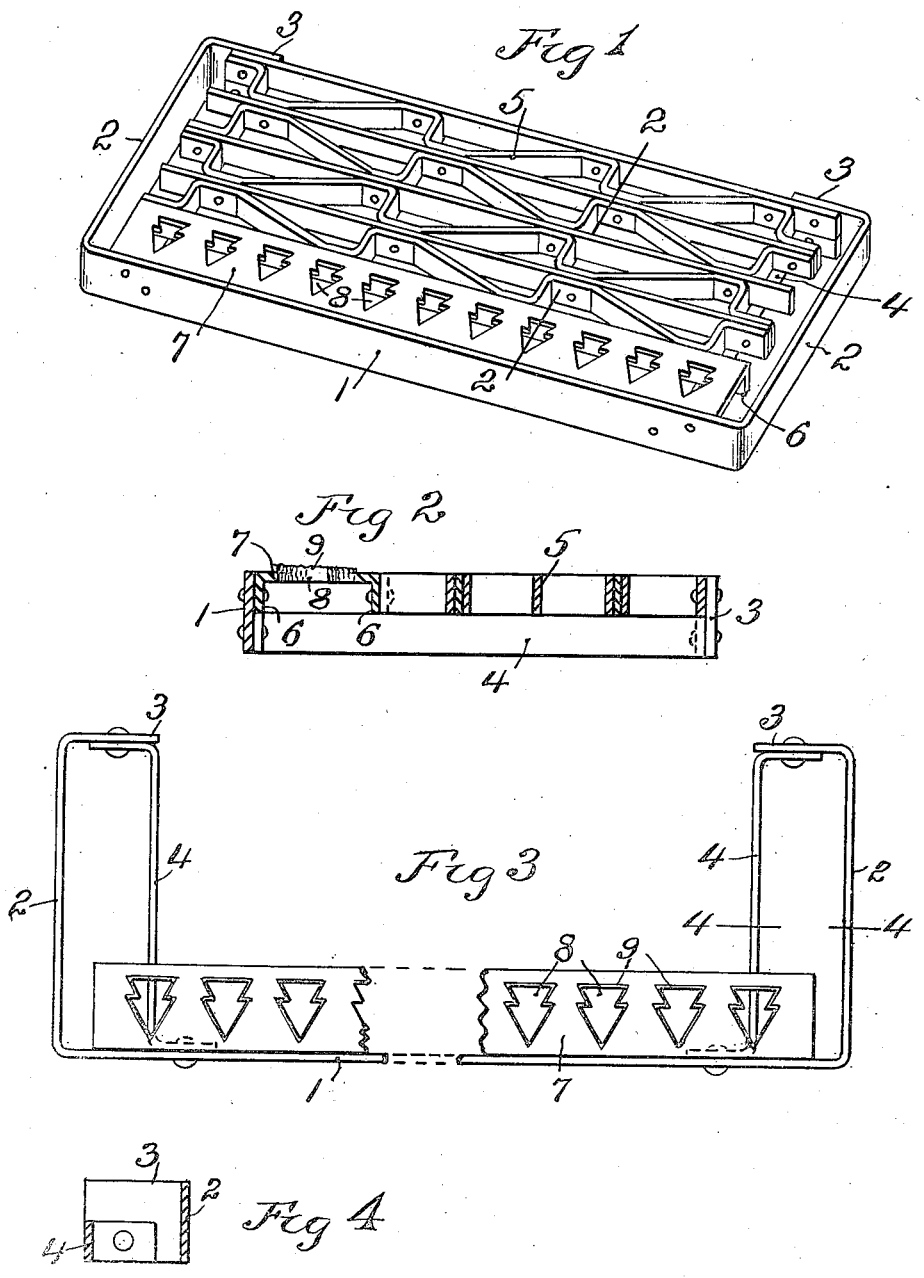
Inventor
William S. Pattison
By Warren D. House
His Attorney

Patented Nov. 8, 1938

2,135,837

UNITED STATES PATENT OFFICE 2,135,837

STAIR TREAD

William S. Pattison, Johnson County, Kans.

Application January 15, 1938, Serial No. 185,140

4 Claims. (Cl. 189—43)

My invention relates to improvements on stair treads of a type employing a nosing member and tread grating at the rear thereof. It is an improvement on a stair tread disclosed in U. S. patent No. 1,471,569, date October 23, 1923 in which the tread grating extended rearwardly from and was attached to and was supported by a nosing bar disposed edge up. With such a structure, as most of the tread exposed to the view of a person descending the stairs is the grating, it blends in appearance with the tread next below, and makes it difficult to distinguish the front edge of the tread, thereby creating a hazard. Another objection to such a tread is that, unless made of quite heavy material, the middle of the nosing and front part of the grating becomes bent downwardly with use.

One of the objects of the present invention is to provide novel means by which the front edge portion of the tread is made clearly distinguishable from the tread next below and greatly strengthened, while retaining the advantages of the tread disclosed in the patent referred to.

Another object of my invention is the provision of a novel tread of the kind described, which is strong, durable, has a minimum of weight, and can be cheaply made and installed.

The novel features of my invention are hereinafter fully described and claimed.

In the accompanying drawing which is illustrative of the preferred embodiment of my invention, Fig. 1 is a perspective view of my improved stair tread.

Fig. 2 is a section on the line 2—2 of Fig. 1.

Fig. 3 is an enlarged plan view, partly broken away, of the tread with the grating removed.

Fig. 4 is a section on the line 4—4 of Fig. 3.

Similar characters of reference designate similar parts in the different views.

1 designates the front portion of a nosing member comprising a metal bar disposed edge up and having at the ends of said front portion two rearwardly extending arms 2, the rear end portions 3 of which are inwardly turned. Supporting means comprise, as shown, two bars 4 having their front ends fastened to the front portion 1, and their rear ends respectively fastened to the rear end portions 3.

Supported on the bars 4 is a tread grating 5, the rear side of which is fastened, as by welding or riveting, to the end portions 3.

Supported on the bars 4 and extending lengthwise of the tread between the front portion 1 and the grating 5 is a reenforcing member, comprising, as shown, a channel bar with its flanges 6 depending and respectively fastened, as by welding or riveting, to the rear side of the front portion 1 and the front side of the grating 5.

The flat horizontal portion 7 of the channel bar between the flanges 6 is of substantial width, and has its upper surface in substantially the same plane as the top of the grating 5 and the upper edge of the front portion 1.

The portion 7 of the channel bar is perforated, preferably, as shown, with a longitudinal row of holes 8, in form simulating forwardly pointing arrowheads. These perforations are provided to make the front edge portion of the tread more distinguishable to a person descending the stairs, and to afford better traction by reason of their forwardly converging edges, thus reducing the liability of slipping, and reducing the weight without materially reducing the strength of the channel bar.

The channel bar greatly increases the strength of the tread while adding little to the weight.

A person descending stairs provided with my improved treads will, due to the perforated channel bar 7, be able to easily distinguish the tread upon which he is standing from the one next below, thus reducing liability of making a misstep.

When the channel bars 7 are perforated with the arrowhead shaped holes 8, the punches which make the holes are forced through the transverse portion of the channel bar toward the outer side thereof, and as the punches do not fit tightly in the dies, a raised flanged edge 9, which is rough, will be formed around the edges of each hole, as is shown in Figs. 2 and 3, thereby providing on the upper surface of the channel bar a roughened surface which will lessen the chance of slipping thereon.

Modifications of my invention, within the scope of the appended claims, may be made without departing from the spirit of my invention.

What I claim is:—

1. In a stair tread, a nosing member having a front portion and two rearwardly extending arms with inwardly turned rear end portions, supporting means attached to said front portion and to said rear end portions respectively, a tread grating resting on said supporting means and attached to said rear end portions, and a channel bar resting on said supporting means and extending lengthwise between and having its flanges respectively attached to said front portion and to said tread grating.

2. In a stair tread, a nosing member having a front portion and two rearwardly extending arms with inwardly turned rear end portions, supporting means attached to said front portion and to said rear end portions respectively, a tread grating resting on said supporting means and attached to said rear end portions, and a channel bar extending lengthwise of the tread with its flanges depending and respectively attached to said front portion and to said tread grating.

3. In a stair tread, a nosing member having a front portion and two rearwardly extending arms with inwardly turned rear end portions, supporting means attached to said front portion and to said rear end portions respectively, a tread grating resting on said supporting means and attached to said rear end portions, and a channel bar extending lengthwise of said tread intermediate of and with its flanges depending and respectively attached to said front portion and to said tread grating and resting on said supporting means.

4. In a stair tread, a nosing member having a front portion and two rearwardly extending arms with inwardly turned rear end portions, supporting means attached to said front portion and to said rear end portions, a tread grating resting on said supporting means and attached to said rear end portions, and a channel bar extending lengthwise of the tread intermediate of and with its flanges depending and respectively attached to said front portion and to said tread grating and resting on said supporting means and having the portion between the flanges perforated, the upper side of said portion having rough upwardly extending projections around the perforations therethrough.

WILLIAM S. PATTISON.